United States Patent [19]

Hodges et al.

[11] Patent Number: 4,928,243

[45] Date of Patent: May 22, 1990

[54] METHOD AND SYSTEM FOR PRINTING GRAPHICS AND TEXT FROM VECTOR-BASED COMPUTER AIDED SOURCE INFORMATION

[75] Inventors: William L. Hodges, Prairie Village; Patrick J. Cheek, Shawnee Mission, both of Kans.

[73] Assignee: Preco Industries, Inc., Lenexa, Kans.

[21] Appl. No.: 106,543

[22] Filed: Oct. 6, 1987

[51] Int. Cl.[5] .................................................. G05F 3/12
[52] U.S. Cl. ..................................... 364/519; 340/747
[58] Field of Search ............... 364/518, 520, 523, 468, 364/519; 340/747; 358/903

[56] References Cited

U.S. PATENT DOCUMENTS

| | | | |
|---|---|---|---|
| 3,430,207 | 8/1966 | Davis | 340/172.5 |
| 3,449,721 | 10/1966 | Dertouzos et al. | 340/172.5 |
| 3,544,972 | 12/1967 | Trousdale | 340/172.5 |
| 3,821,731 | 6/1974 | Levine | 340/324 |
| 3,870,922 | 3/1975 | Shutoh | 315/383 |
| 3,895,357 | 7/1975 | Schwartz et al. | 340/172.5 |
| 3,906,480 | 9/1975 | Schwartz et al. | 340/324 AD |
| 3,973,245 | 8/1975 | Belser | 340/172.5 |
| 4,054,885 | 10/1977 | Rothgordt | 346/154 |
| 4,149,164 | 4/1979 | Reins | 340/701 |
| 4,149,165 | 4/1979 | Herman | 340/740 |
| 4,254,467 | 3/1981 | Davis et al. | 364/521 |
| 4,254,468 | 3/1981 | Craig | 364/523 |
| 4,408,200 | 10/1983 | Bradley | 340/747 |
| 4,458,330 | 7/1984 | Imsand et al. | 364/900 |
| 4,492,956 | 1/1985 | Collmeyer et al. | 340/723 |
| 4,496,976 | 1/1985 | Swanson | 358/147 |
| 4,510,568 | 4/1985 | Kishi et al. | 364/300 |
| 4,516,266 | 5/1985 | Christopher et al. | 382/48 |
| 4,529,978 | 7/1985 | Rupp | 340/727 |
| 4,533,910 | 8/1985 | Sukonick et al. | 340/721 |
| 4,549,275 | 10/1985 | Sukonick | 364/521 |
| 4,555,700 | 11/1985 | Convis et al. | 340/721 |
| 4,555,763 | 11/1985 | Dahme | 364/521 |
| 4,587,633 | 5/1986 | Wang et al. | 364/900 |
| 4,607,340 | 8/1986 | Nagai | 364/521 |
| 4,616,327 | 10/1986 | Rosewarne et al. | 364/518 |
| 4,625,288 | 11/1986 | Weiner et al. | 364/521 |
| 4,631,532 | 12/1986 | Grothe | 340/703 |
| 4,646,134 | 2/1987 | Komatsu et al. | 358/11 |
| 4,648,049 | 3/1987 | Dines et al. | 364/521 |
| 4,660,029 | 4/1987 | Houda et al. | 340/744 |
| 4,665,492 | 5/1987 | Masters | 364/468 |
| 4,722,064 | 1/1988 | Suzuki | 364/518 |
| 4,740,904 | 4/1988 | Nagle | 364/520 |

Primary Examiner—David L. Clark
Attorney, Agent, or Firm—Hovey, Williams, Timmons & Collins

[57] ABSTRACT

A method and conversion system are provided for enabling a laser printer or the like to produce drawings including graphics and text from input supplied by a computer aided design (CAD) system which allows text font style to be selected as desired and which produces curved lines as smooth curves. The preferred apparatus and method convert entity descriptions supplied by the CAD system in vector notation into signal representative of entity descriptions in device notation whereby the output device uses the signals to create an entity image according to the type of entity such as an arc, text, or the like, and according to corresponding plotting data defining the parameters of the entity. The system and method also allow the user to enter signals representative of the desired font style of the text characters, gray scale levels, and reverse image if desired while also creating curved line images as smooth curves rather than as a series of straight short line segments.

11 Claims, 9 Drawing Sheets

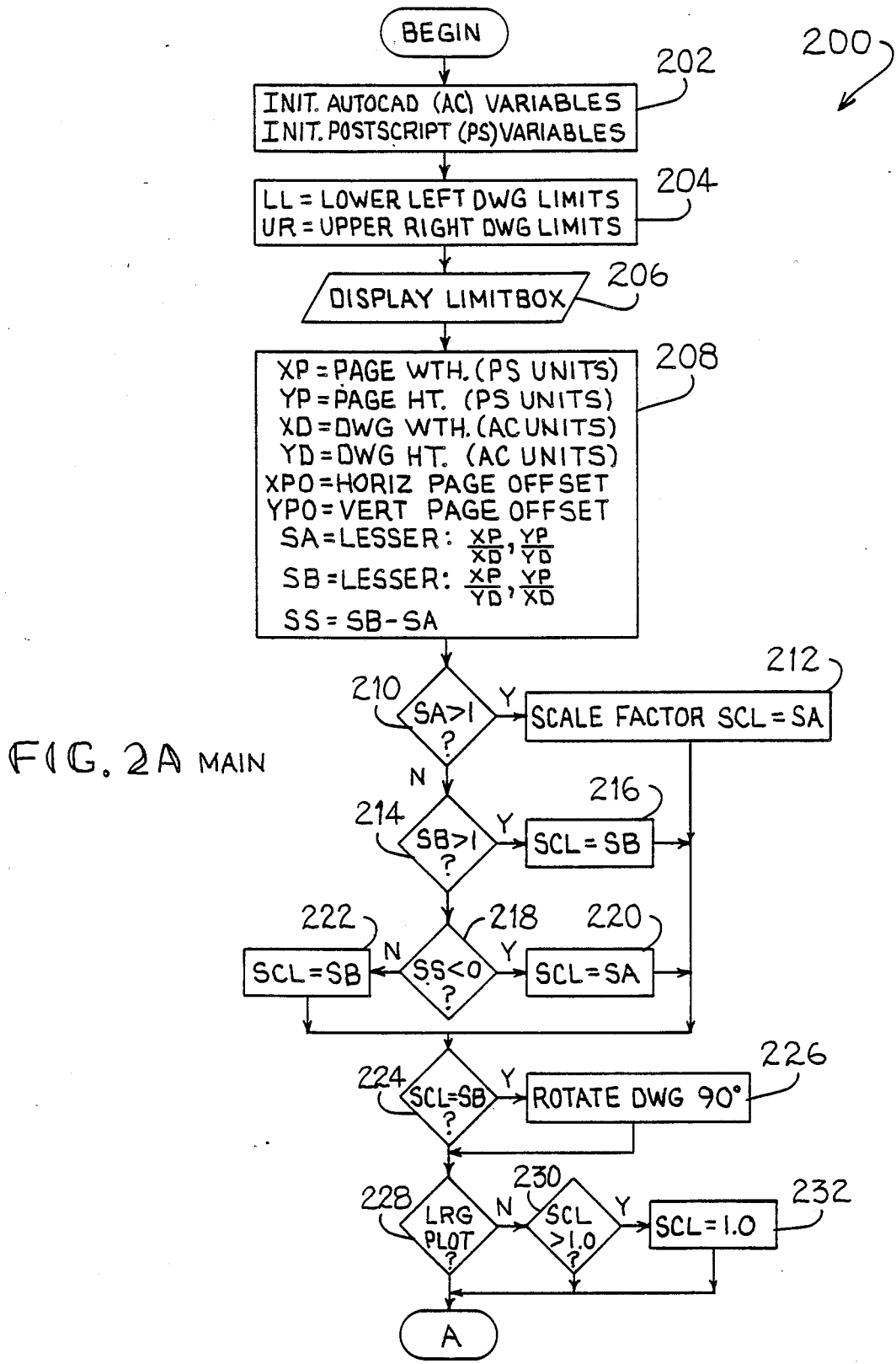
FIG. 2A MAIN

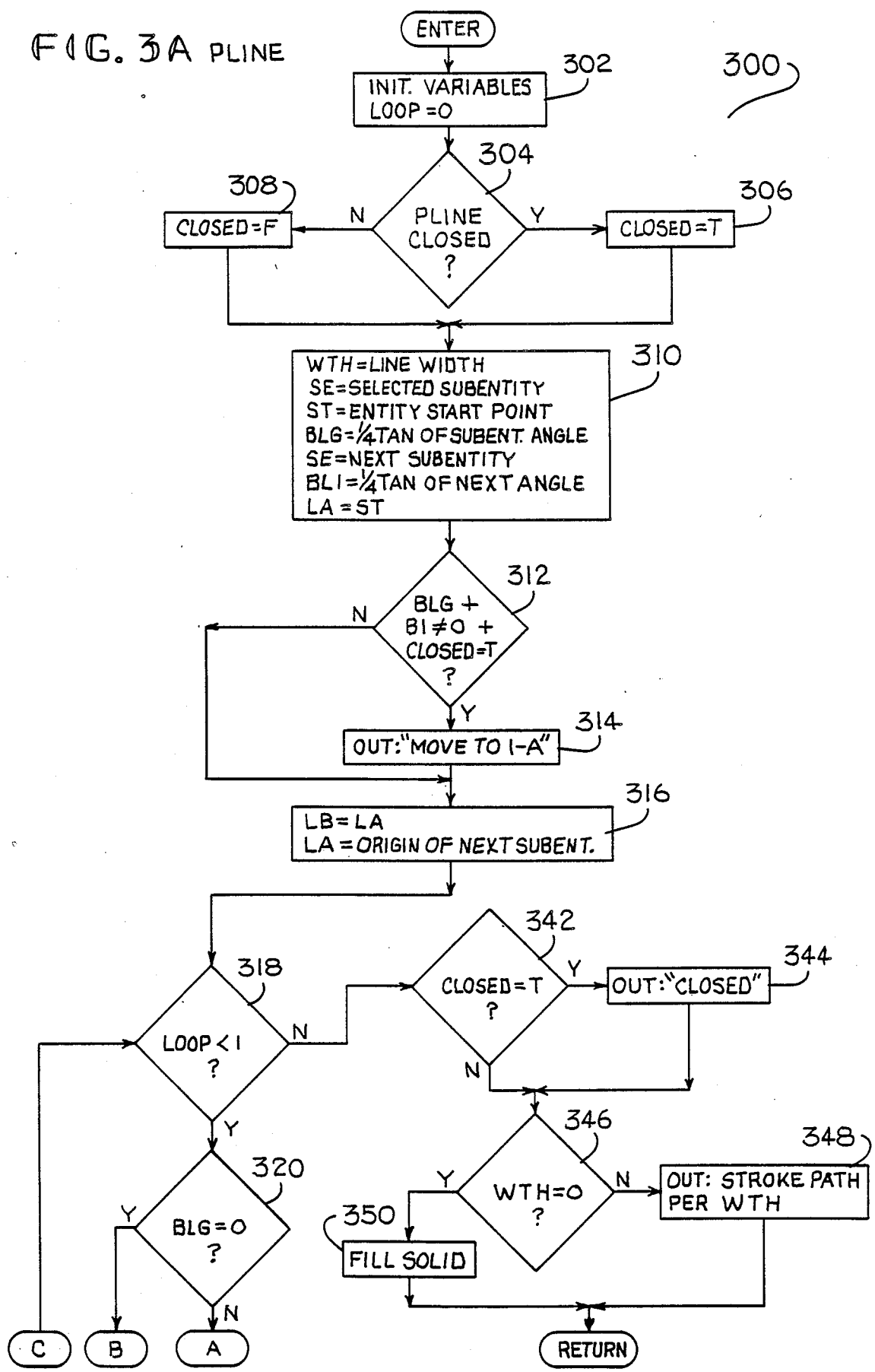
FIG. 3A PLINE

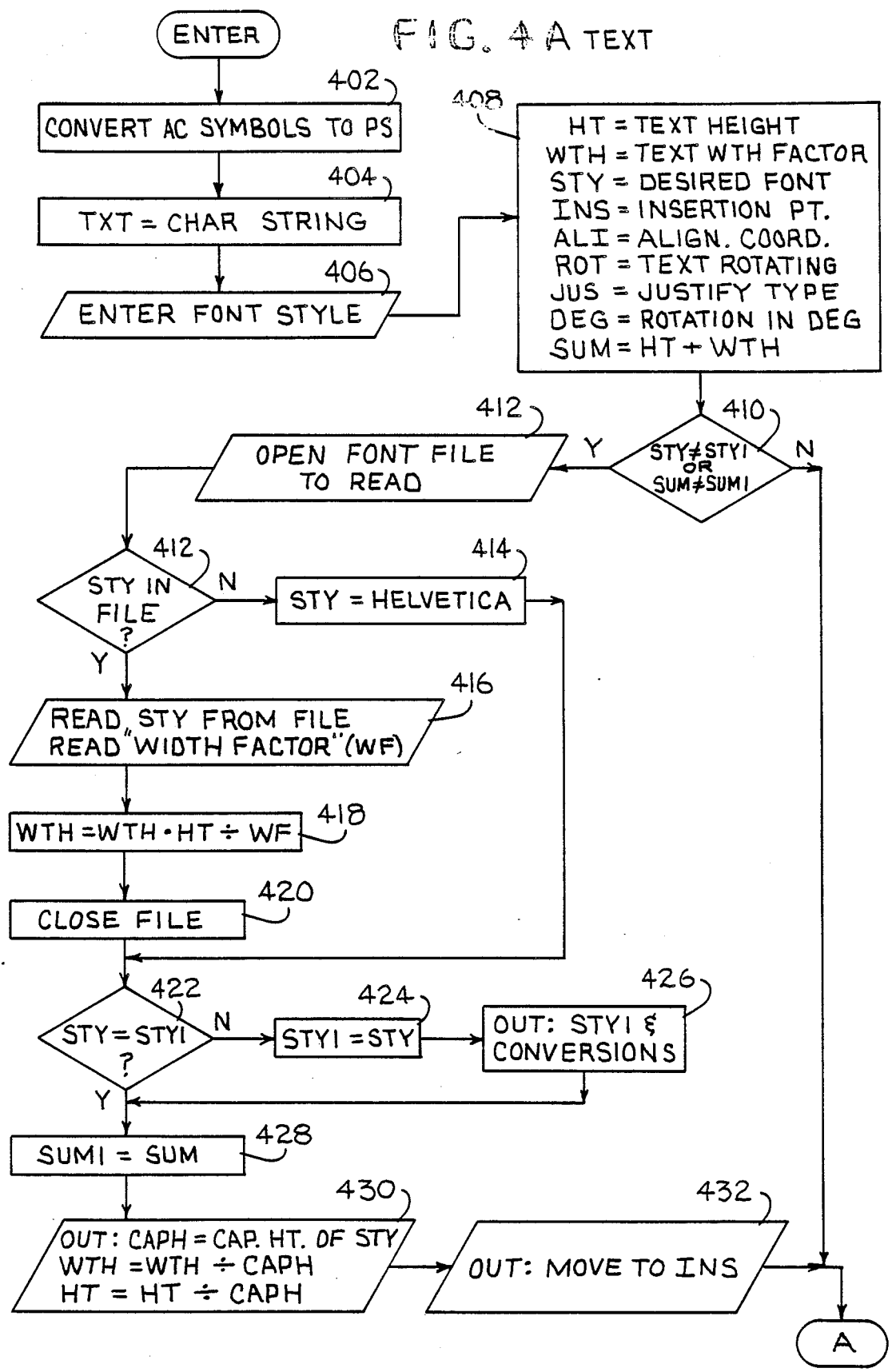
FIG. 4A TEXT

METHOD AND SYSTEM FOR PRINTING GRAPHICS AND TEXT FROM VECTOR-BASED COMPUTER AIDED SOURCE INFORMATION

BACKGROUND OF THE INVENTION

1. Field of the Invention

The present invention is concerned with a method and system for producing drawings generated by a computer aided design (CAD) system on an output image creation device such as a laser printer, imagesetter, or the like. More particularly, the present invention is concerned with identifying the drawing entities such as arcs, text, and the like and converting the plotting data in vector notation into corresponding plotting data in notation appropriate so that the image device can recreate images of curved lines as smooth curves and whereby the font style of the text can be selectively varied.

2. Description of the Prior Art

Computer aided design (CAD) systems greatly enhance the creation of engineering drawings, patent drawings, or the like both from the standpoint of initial drawing productivity and ease of corrections. Frequently, an X-Y pen plotter is used as the output image device from the CAD system for creating hard copy drawings. Although such drawings are adequate for many purposes, drawings produced by an X-Y pen plotter are often not print quality sufficient for subsequent offset lithographic processes.

In order to produce print quality drawings from CAD systems, various devices and methods have been devised which enable output to a raster-based print device such as electrostatic plotters, laser printers, dot matrix printers, and so forth. Such raster-based printers are desirable because they can produce print quality drawings having high resolution.

Various systems and methods are known in the prior art which convert drawing entity descriptions in vector format from a CAD system into raster-based descriptions suitable for input to a raster-based printer. For example, U.S. Pat. Nos. 4,254,467 and 4,458,330, which are hereby incorporated by reference, disclose systems and methods for converting entity descriptions in vector notation into raster formats suitable as input to raster-based image devices.

While such raster-to-vector conversion systems and methods have greatly enhanced the prior art, disadvantages still exist which inhibit the wider use of CAD systems. For example, a CAD system presents the output for a curve as a series of short, straight vectors. That is to say, even though the curved line segments such as an arc may be described mathematically as a smooth curve, the output from the CAD system describes the curve as short vectors which, in the limit, approximate a smooth curve. The vector-to-raster conversion systems and methods merely convert the short vectors into corresponding short line segments as the output image from the raster-based printer. Thus, the image of the curve on the finished drawing, while of print quality, is composed of a series of short, straight line segments.

Similarly, CAD systems present the output for text characters also as a series of straight vectors. Vector-to-raster converters in turn convert these vectors into a raster format for output as a corresponding plurality of straight line segments. The raster-to-vector converters are not designed to identify the text character as a character per se, and thus do not enable font style variation of the character.

Additionally, CAD systems even when used with vector-to-raster converters and raster-based printers, do not allow gray scale variation of the output drawing lines and, furthermore, do not provide the capability for reversing an image as white-on-black, for example, rather than the typical black-on-white image.

SUMMARY OF THE INVENTION

The present invention enhances the prior art by solving the problems as outlined above. More particularly, the present invention allows an image creation device such as a laser printer or the like receiving input from a CAD system, to produce images of curved lines as smooth curves, to vary the font style of the text characters included as part of the drawing, to vary the gray scale of the output image lines, and to reverse the output image if desired.

The preferred method and apparatus of the present invention: select a given entity description, identify the type of the entity described, convert the plotting data in vector notation of the selected entity into corresponding plotting data in printer device notation according to the type of entity being described, and produce signals for output representative of the entity description in image device notation. The signals are suitable for use by an image creation device on order to create an image of the drawing entity according to the type of entity and according to the corresponding plotting data defining the parameters of the entity.

More particularly, the method and system hereof identify an arc description as an arc convert plotting data into corresponding plotting data in a notation suitable for the image device whereby the device can then create a smooth curve of an image of the arc according to the parameters of the corresponding plotting data. In this way, the arc is created as a smooth curve rather than merely converting the short vectors presented by the CAD system into corresponding short segments as an approximation of the curve.

Additionally, by identifying a text entity as such, the present invention allows the user to select a desired font style of the character according to the font style memory typically residing in an image device such as a laser printer.

Furthermore, the system and method hereof allow the user to select a desired gray scale of the image lines to be produced by the printer and to reverse image of the drawing entity if desired.

BRIEF DESCRIPTION OF THE DRAWINGS FIGURES

FIG. 2a is a computer program flowchart of a portion of the main program of the present invention;

FIG. 2b is a continuation of the flowchart of FIG. 2a;

FIG. 3a is a computer program flowchart of a portion of the subroutine PLINE incorporated as part of the main program of FIGS. 2a–d;

FIG. 3b is a continuation of the flowchart of FIG. 3a;

FIG. 4a is a computer program flowchart of the subroutine TEXT included as part of the main program of FIGS. 2a–d; and FIG. 4b is a continuation of the flowchart of FIG. 4a.

DETAILED DESCRIPTION OF THE PREFERRED EMBODIMENTS

Figure 1:
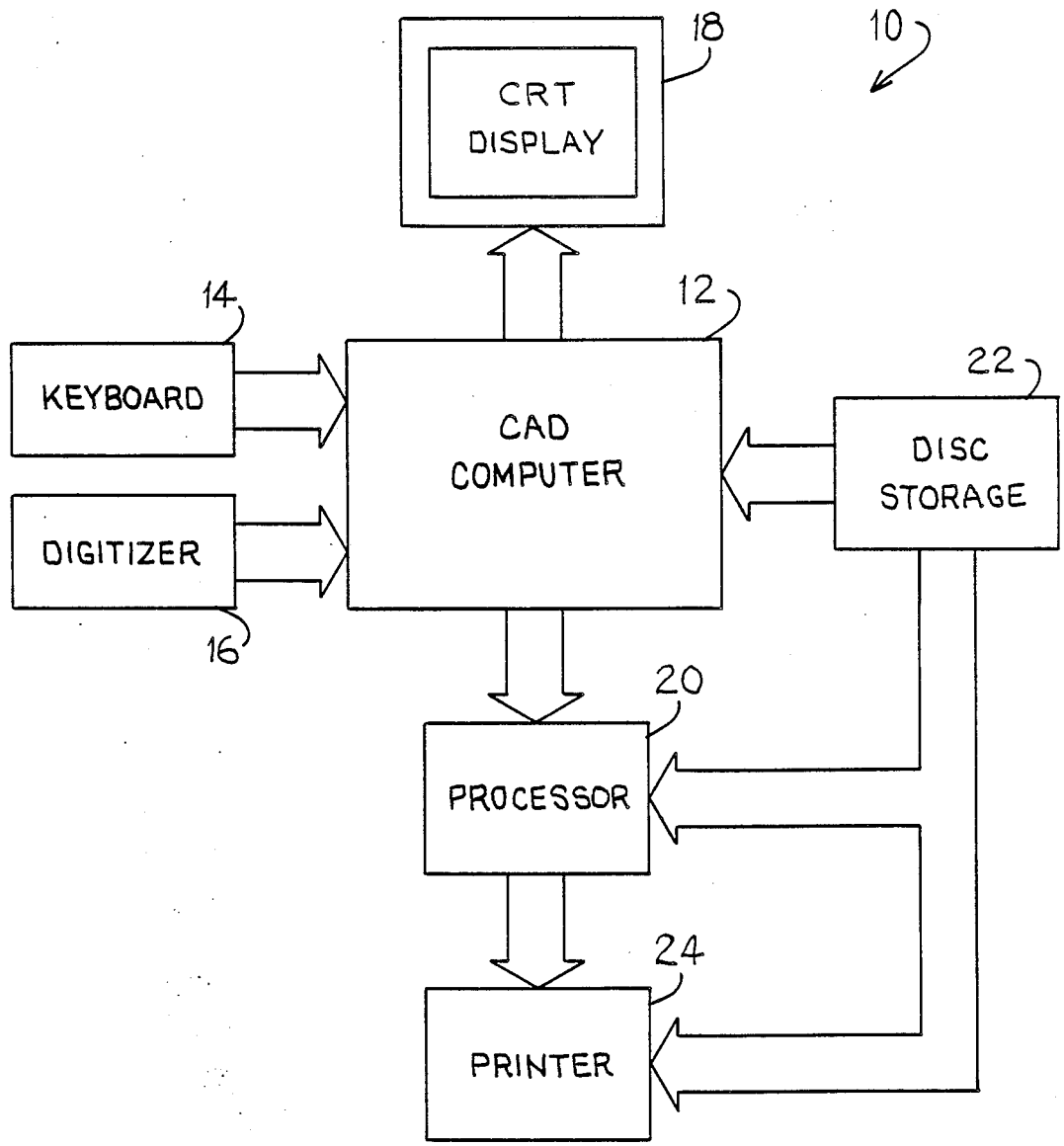
FIG. 1 is a schematic diagram of a computer aided design system incorporating the present invention.

The present invention is advantageously used in connection with a conventional computer aided design (CAD) system as schematically illustrated in FIG. 1. CAD system 10 advantageously includes the conventional components of a computer 12, input keyboard 14, input digitizer 16, output cathode ray tube (CRT) display 18, signal processor 20, floppy disc storage unit 22, and output printer 24.

Computer 12 is preferably a type 30386 microcomputer incorporating hard disc drive on which is stored an appropriate CAD program such as AutoCAD which is preferred. Conventional keyboard 14 is typically used for inputting character information to computer 12. Conventional digitizer 16 is used to input drawing entity data such as the beginning and end points of a line to be drawn and uses either a light pen or mouse, both familiar to those skilled in the art.

Computer 12 also includes an output graphics circuit board suitable for displaying the drawing on display 18.

Signal processor 20 converts the signal output from computer 12 which is in vector notation into a device notation delivered as signals to printer 24. Preferably, printer 24 is a conventional laser printer having a resolution of 600 dots per inch rather than the more common resolution of 300 dots per inch. The higher resolution is preferred for quality graphics images.

Processor 20 can also deliver its output as a matter user selection to floppy disc storage unit 22 which places the output on a floppy disc for subsequent delivery from unit 22 to printer 24 or other image device. This adds the additional flexibility in that the floppy disc can be delivered to another output device such as a laser imagesetter if desired, or to a modem for transmission to a remote printing device. Unit 22 is also used to deliver program data and other data to computer 12 and processor 20.

Signal processor 20 which, in the context of the present invention, converts CAD system data into output signals suitable for use by printer 24, can be a conventional personal microcomputer (PC) but is preferably incorporated as part of computer 12. That is to say, computer 12 is preferably used to perform all the functions of processor 20 which avoids the expense of a separate unit. Processor 20 is shown schematically separate in FIG. 1 for the purpose of emphasizing its functional distinction. Preferably, disc storage unit 22 is also incorporated and controlled as part of computer 12 in that conventional 80286 microcomputers include a floppy disc drive as well as a hard drive.

Printer 24 can be any image creation device used for creating either a hard copy image on paper, film, or the like, or for creating a more transient image such as that on a CRT display or LCD display. Printer 24 is functionally distinguished from CRT 18, however, in that a typical laser printer for example, has a memory associated therewith which includes information for drawing certain conventional drawing figures and textural characters. For example, the memory unit typically includes information for instructing printer 24 to draw straight lines, smooth curves, and the like when the drawing entities are identified as such and when the proper plotting data are provided defining the parameters of the entity. Typical laser printers are configured to receive instructions for creating entities in a page description language such as POSTSCRIPT which is preferred. In POSTSCRIPT, an arc, for example, is described by specifying the center of the arc, the radius, and the respective start and end point angles. A circle is described by specifying the center and radius as well as identifying the entity as a circle. Text characters are identified by specifying the character name, e.g., "lower case n" and the font style, e.g., "helvetica", as well as other pertinent data such as the insertion point of the lower left location of the leftmost character.

The present invention concerns a method and system for operating CAD system 10 or the like preferably in conjunction with integrally included processor 20 whereby the signal data from computer 12 describing drawing entities in a vector format are converted into signals for use by printer 24. These output signals represent plotting data preferably in POSTSCRIPT notation so that printer 24 can create an image of the entity according to the signals received from processor 20.

Preferably, the method and system of the present invention for operating CAD system 20 are embodied on a magnetic storage medium such as a floppy disc including the computer program illustrated in the flowcharts of FIGS. 2–4. The program is preferably written in the language AUTOLISP (which is the AutoCAD version of the language LISP) in an MS-DOS operating environment appropriate for the conventional components chosen. Those skilled in the art will appreciate that the programming language in which the computer program flowcharts are encoded is a matter of design choice depending upon the operating environment of the system, the language of the software used in operating computer 12, the software language used for printer 24, and other variables well known to those skilled in the art.

FIGS. 2a–4b illustrate the computer program flowchart for the main loop and two of the subroutines for implementing the method of the present invention for operating CAD system 10. The program is referred to herein as AutoScript ™.

FIGS. 2a–d illustrate the main program loop which, in general terms, initializes the various AutoCAD, AutoScript, and POSTSCRIPT variables, determines the scale of the drawing to be printed, determines whether the drawing should be rotated relative to the page, initiates subroutines used to convert the various drawing entities, sets the gray scale of the drawing entity images, and enables drawing entity image reversal.

The main program loop enters at step 202 which intializes the various software variables to those desired or to default values as a matter of design and drafter choice. Additionally, this step records the current AutoCAD system variables for.setting those variables back their to their original values at a latter point in the program.

Step 204 defines the lower left (LL) and upper right (UR) drawing limits according to default values which may be the entire drawing as displayed on CRT display 18 or in the alternative, can prompt the system drafter to enter different drawing limits by way of a light pen or mouse on digitizer 16 as desired.

In step 206, the program draws a "limit box" around the display drawing figure or portions thereof which are to be created on the output drawing.

In step 208, the program defines the software variables as shown for use in defining the output scale of the drawing. The variables XP and YP are respectively the page width and page height dimensions in POST- SCRIPT units of the drawing page produced by printer 24. Correspondingly, the variables XD and YD are the drawing width and drawing height in AutoCAD units of the drawing as created and/or displayed on CRT 18. The variables XPO and YPO correspond to the horizontal and vertical page offsets, that is margins, of the drawing page. That is to say, XPO and YPO define the margins of the output page so that drawing lines do not extend all the way to the edge of the page.

The variable SA is defined as the lesser of the ratios: XP divided by XD, or YP divided by YD. Correspondingly, SB is defined as the lesser of the ratios: XP divided by YD, or YP divided by XD. SS is defined as the difference between SB and SA. The variables SA, SB, and SS are used in the subsequent steps and are used to determine scale factor of the output drawing and also help determine whether the drawings should be rotated.

A given drawing may be relatively tall and narrow which may coincidentally correspond very well to the proportions of the drawing output page. In such a case, the drawing need only be scaled to the lowest proportional dimension to provide a good fit on the output page. Conversely, however, the drawing may be short and wide which would not fit well on the output page. Thus, such a drawing should be rotated 90 degrees when produced on the page to more nearly align with the page dimensions. The next few steps in the program are provided to determine the best fit of the selected drawing portion with regard to the dimensions of the drawing output page.

Step 210 asks whether the variable SA is greater than 1. If the answer is yes, the program sets the scale factor (SCL) for the drawing equal to variable SA in step 212. If step 210 is no, the program in step 214 asks whether the variable SB is greater than 1 which, as will be seen below, indicates that the drawing should be rotated and scaled. If 214 is yes, the program sets the scale factor as SB in step 216.

If neither SA nor SB are greater than 1, this indicates that a good proportional fit, rotated or not, is not possible, and the scale factor will need to be set at the best possible fit. To determine the best possible fit, of the program asks in step 218 whether the variable SS is less than zero, that is whether variable SA is larger than SB. If such is the case, the program sets the scale in step 220 equal to SA as the best scale factor. If 218 is no, the program sets the scale factor equal to SB in step 222. At the conclusion of steps 212, 216, 220, or 222, the program moves to step 224 which asks whether the scale factor has been set equal to SB which occurs when the best fit of the drawing occurs if it is rotated 90-degrees relative to the page. If step 224 is yes, step 226 sets the instruction to rotate the drawing 90-degrees when it is produced by printer 24.

From steps 224 or 226 the program moves to step 228 which asks whether the drawing is to be produced as a large plot. In other words, step 228 asks whether the drawing is to be scaled to fit the entire available space on the page without distorting the proportional dimensions of the drawing. The variable LRG PLOT is set as part of the AutoCAD system variables when initialized. If 228 is no, the program moves to step 230 which asks whether the scale factor as previously determined is greater than 1.0. If yes, the scale factor is changed and set as 1.0 in step 232.

If the answer to step 228 is yes, the answer in step 230 is no, or at the completion of steps 232, the program moves on to step 234 which activates CRT display 18 to display the scale factor SCL and prompts the drafter on the screen to enter whether the displayed scale factor is acceptable. If not, the drafter enters the desired scale factor in step 238. After step 238 or if the answer in step 236 is yes, the program moves on to step 240 which redefines the drawing width XD and the drawing height YD according to the new scale factor and then in step 242 erases the limit box circumscribing the selected drawing portion on CRT display 18.

The program then moves on to step 244 which asks whether the drawing is to be centered on the page. If yes, steps 246 and 248, or step 250 redefine the page margins XPO and YPO according to the formulas shown so that the drawing is centered. That is, if the answer in step 244 is yes, and the drawing is not to be rotated in step 246, the program moves to step 248 which redefines horizontal and vertical page offset variables XPO and YPO as shown which shifts these variables according to the difference in widths and heights of the drawing and page limits. Similarly, step 250 redefines XPO and YPO accordingly if the drawing is to be rotated as determined in step 246. If the drawing is not to be centered as determined in step 244, steps 246, 248 and 250 are bypassed and the program moves to step 252.

Figure 2B:
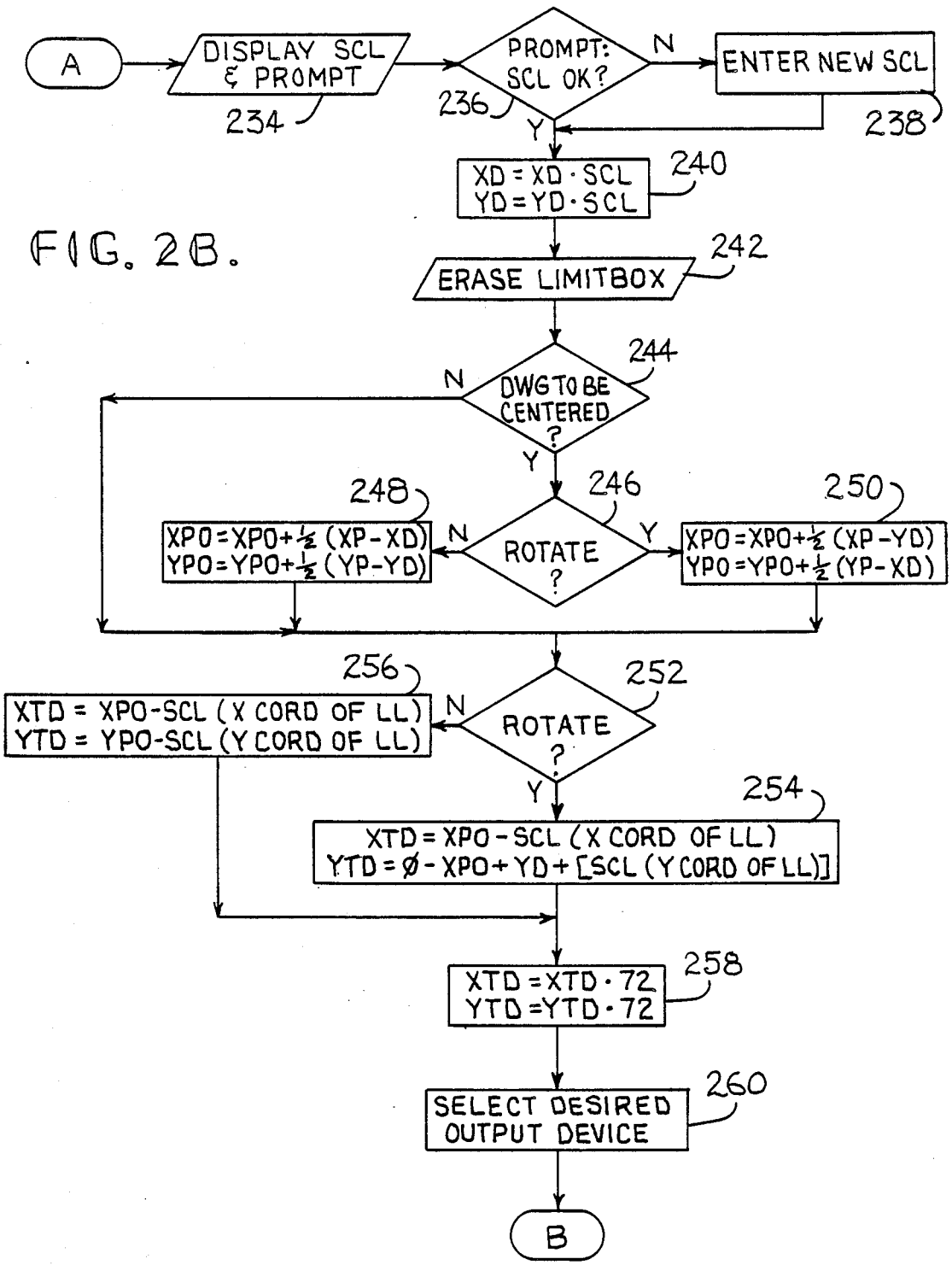
Figure 2C:
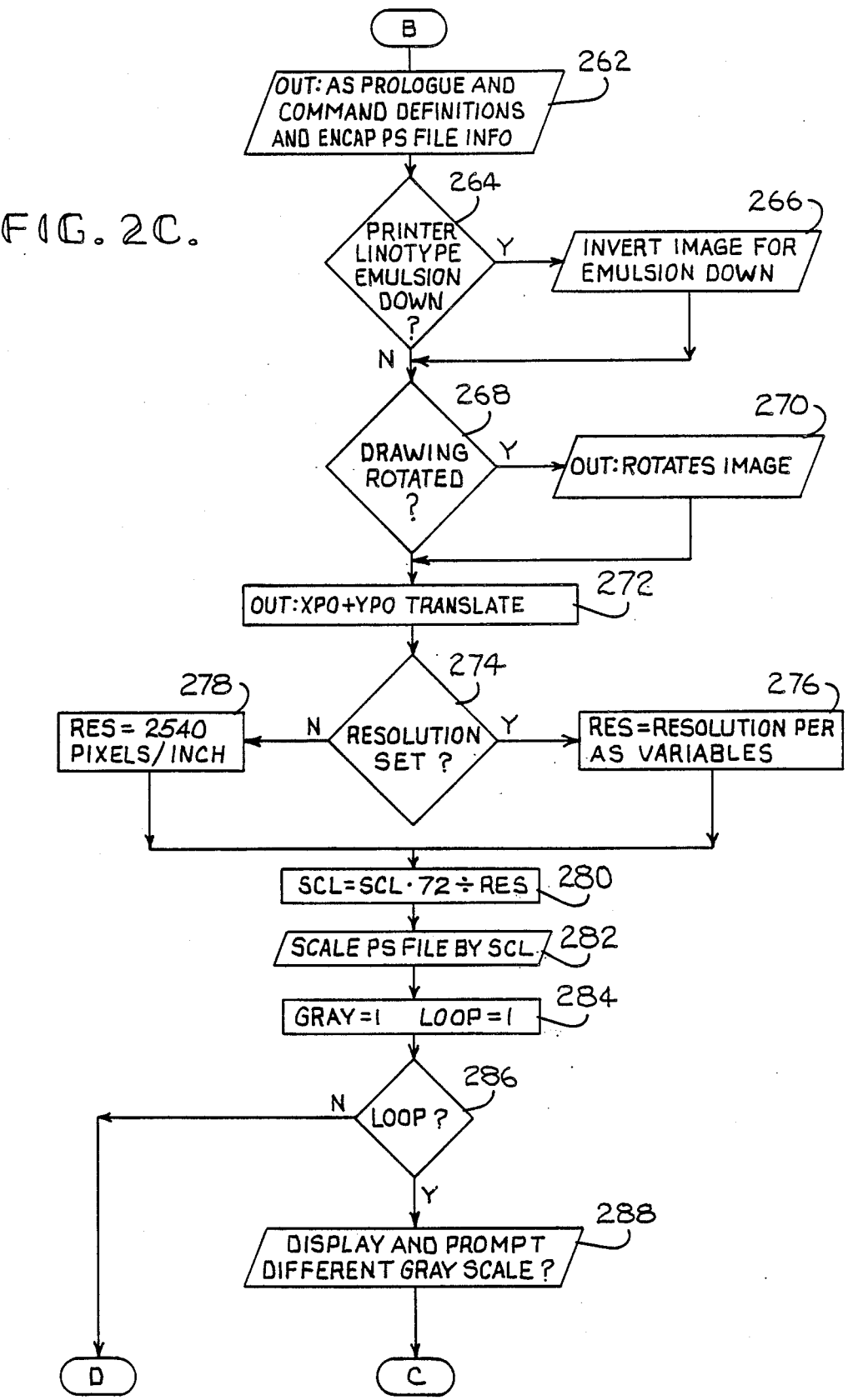
FIG. 2c is a continuation of the flowchart of FIG. 2b.
Figure 2D:
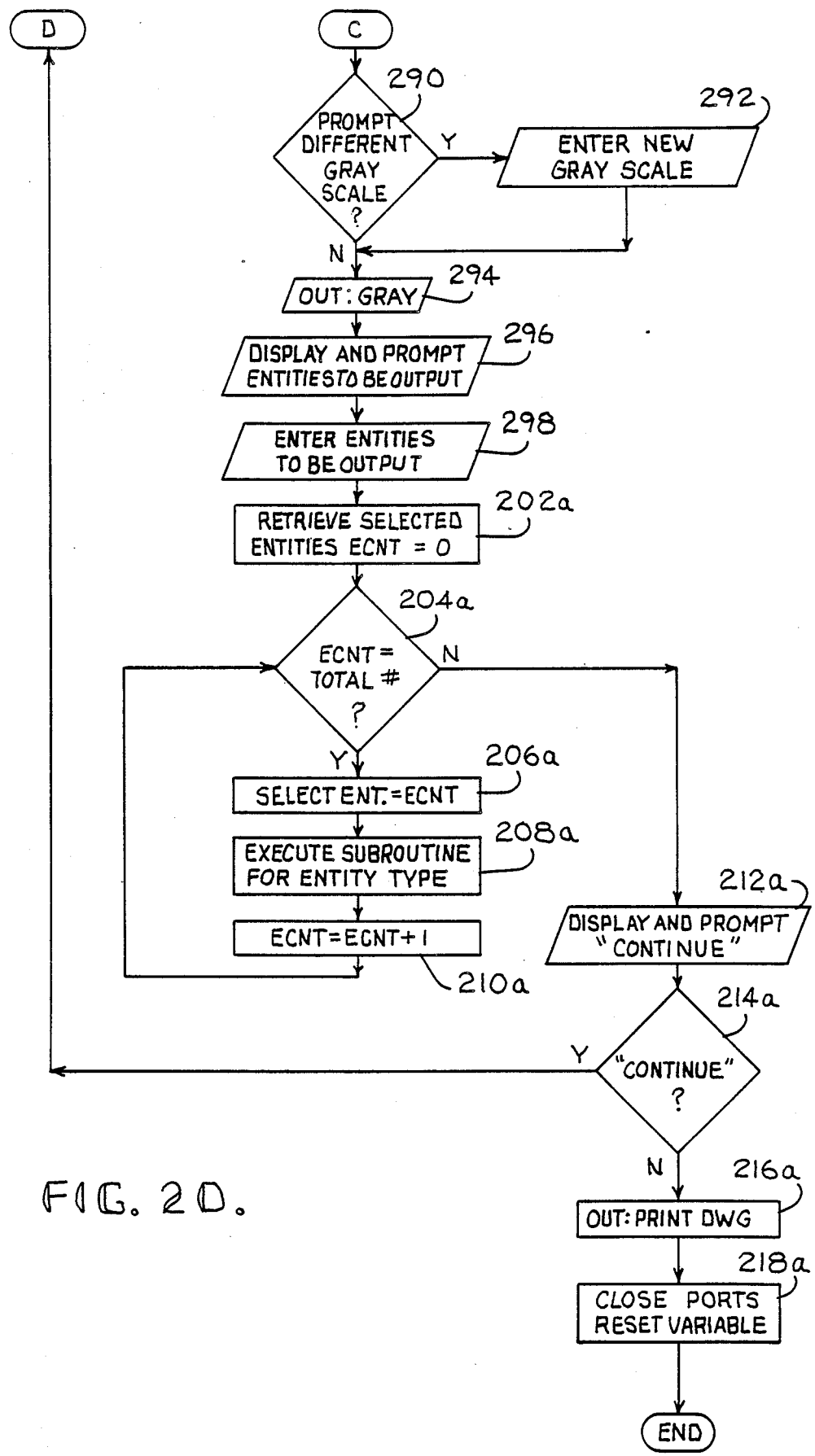
FIG. 2d is a continuation of the flowchart of FIG. 2c.

Steps 252, 254, and 256 establish the criteria for actually translating the AutoCAD coordinates of the image into coordinates of the output page. Step 252 asks whether the drawing is to be rotated. If yes, new variables XTD and YTD are defined for the lower left corners of the drawing. Variable XTD defines the X coordinate which equals the page offset variable XPO less the scale factor SCL times the X coordinate of the lower left page limit (LL) in AutoCAD units. Similarly, the variable YTD is defined according to the formula as shown in FIG. 2b and defines the Y or vertical coordinates for the lower left page limit. If, in step 252, the drawing is not to be rotated, the calculation for the X and Y coordinates of the lower left page limit are somewhat simpler as shown in step 254.

After defining the lower left page limits in steps 254, 256, the program moves on to step 258 to convert the XTD and YTD into POSTSCRIPT units which is in units of 1/72 inches.

The program next moves to step 260 in order to define the output location for the file. Advantageously, the program can be arranged to prompt the drafter to ask whether the output should go to printer 224 or to disc storage unit 22, for example. The program then moves to step 262 which outputs the AutoSCRIPT prologue and command definitions and also sends the POSTSCRIPT file information to the output device in the appropriate coded formats.

In step 264, the program asks whether the output device is a LINOTYPE and if the emulsion is to be down. If yes, the program inverts the drawing image in step 266 for the emulsion down.

If the answer in step 264 is no, or after step 266, the program moves on to step 268 which asks whether the drawing is to be rotated. If yes, step 270 outputs the instruction to rotate the drawing image for placement on the output page. If the answer in step 268 is no, or after 270, the programs moves on to step 272 which outputs the translation values XFO and YPO as previously defined in steps 248 or 250.

In step 274 the program asks whether the resolution of the output drawing has been previously defined, for example, in step 202 when variables were initialized. If the resolution has been set, the program moves on to step 276 to define the software variable RES as the predefined resolution. If the resolution was not previously set as determined in step 274, the program moves on to step 278 to define the resolution as 2540 pixels per inch. Generally, it is desirable to define a resolution equal to that of the highest resolution output device which may be used, in this case a LINOTYPE. Even though the resolution of the output device may be less than that defined by the variable RES, the output device will, of course, only create the image to the limit of its resolution capability.

After steps 276 or 278, the program moves on to step 280 to redefine scale factor SCL in terms of the POSTSCRIPT increments and resolution according to the calculation as shown. The program then moves to step 282 which outputs the instruction to scale the POSTSCRIPT file by the newly defined scale factor SCL.

The next few steps of main program 200 are included for enabling the selection of a desired gray scale value of the output image. This capability is not present in existing CAD systems.

After step 282, the program in step 284 initially defines the variables GRAY=1 and LOOP=1. The program then moves to step 286 which asks whether the variable LOOP has been defined which it was in step 284. Step 286 ensure that the program executes at least one loop.

The program then moves to step 288 which displays the drafter prompt "different gray scale" which allows the drafter to enter a desired gray scale value. If the drafter desires to enter a different gray scale value, the answer is yes in step 290 and the drafter then enters the desired gray scale value in step 292. If the answer in step 290 is no or after step 292, the program moves to step 294 to output the gray scale variable GRAY to the output device.

The program then moves to step 296 which displays the prompt instructing the drafter to indicate the entities to be outputed. That is to say, even though a drawing portion has been previously defined as indicated by the limit box in step 206, the drafter may not wish all of the drawing entities to be outputed. Thus, in step 298, the drafter enters the desired drawing entities to be processed.

The program then moves to step 202a in which the program retrieves the selected entities and defines the variable entity count (ECNT) initially at zero. The program then moves to step 204a which asks whether the variable ECNT is less than the total number of entities. If yes, which will be the case until all of the selected entities have been processed, the program moves to step 206a which selects the entity equal to ECNT. During the first time through the loop ECNT=0.

The program then moves to step 208a which executes one of a variety of subroutines depending on the type of drawing entity selected. The flowcharts for the two most complicated of the subroutines are shown in FIGS. 3a,b and 4a,b. These subroutines will be explained further hereinbelow. After execution of the appropriate subroutine in step 208a, the program moves to 210a which increments variable ECNT and loops back to step 204a whereby the next entity in sequence is selected in step 206a and so forth.

After all of the entities have been processed, the answer in step 204a is no and the program moves on to step 212a which prompts the drafter whether this loop should be continued. In step 214a, the drafter enters yes if a different set of entities are to be processed at a different gray scale value. Thus, the invention hereof allows the drafter to select certain of the entities in step 298 to be processed according to the gray scale value entered in step 292 and then by answering yes in step 214, allows the drafter to set a new gray scale value for a new set of drawing entities identified in step 298. If the answer in step 214a is yes, the program loops back to step 286.

If the answer in step 214a is no, the program moves to step 216a and outputs the instruction to print the drawing.

The program then finishes up in step 218a by closing the output port and resetting the variables back to the former values which were initialized in step 202.

As discussed above in connection with 208a, the program executes subroutines corresponding to the different types of drawing entities created within the CAD system. More particularly, AutoCAD identifies drawing entities such as arc, line, circle, text, polyline, and so forth. A polyline drawing entity is composed of a series of connected lines and/or arcs which may or may not form a closed figure. Thus, a polyline entity is somewhat inclusive of a line, arc, and solid if the polylines form a closed figure and the closed figure is to be solid uniform gray scale.

Figure 3B:
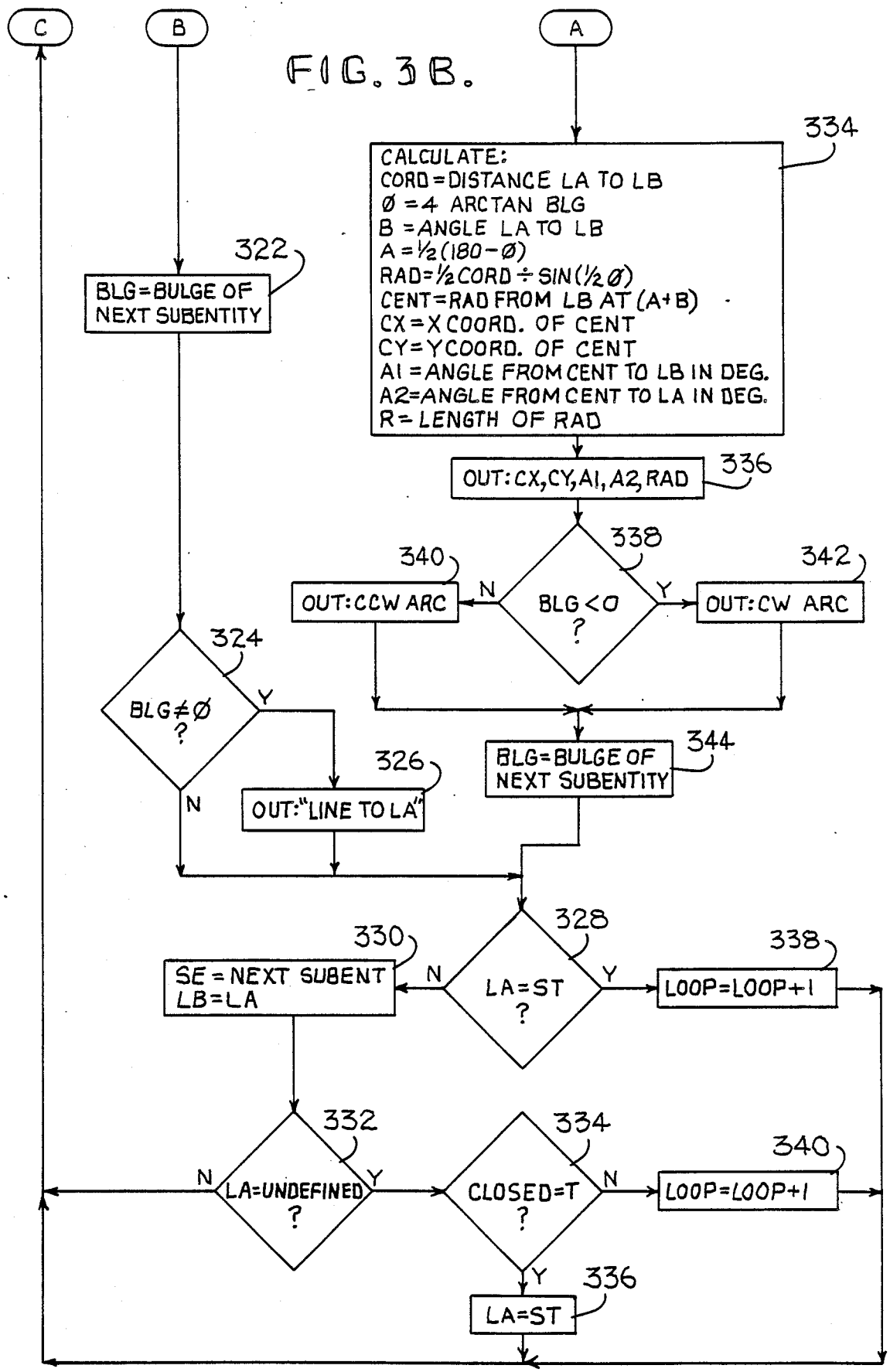

FIGS. 3a and 3b illustrate the flowchart for the subroutine PLINE (polyline). Generally speaking, the subroutine PLINE converts the AutoCAD plotting data into corresponding plotting data usable by laser printer 24, for example, in creating the desired polyline entity. That is to say, rather than merely translate the short segments of an arc, for example, as presented by an AutoCAD output, the invention hereof identifies the entity type and supplies the appropriate plotting data needed by the output device for creating that entity. Thus, subroutine PLINE is not merely a translation of AutoCAD data from one coordinate system to another, but rather handles the AutoCAD entities as entities per se.

Subroutine PLINE 300 enters at step 302 which initializes the software variables and then moves on to step 304 which asks whether the polyline is a closed figure. If yes, the program sets the software variable closed as true (T) in step 306. If the polyline is not closed, the variable CLOSED is set as false (F) in step 308.

After steps 306 or 308 the program moves to step 310 to define the variables as shown. Subroutine polyline is designed to handle both straight lines and arcs. In AutoCAD, arcs are defined as having a start point and a "bulge" which is defined as ¼ the tangent of the included angle of the arc. Also, in AutoCAD, a polyline entity is described as a series of instruction lists or subentities with the first subentity being a header with identifying information but having no information concerning an actual drawing component. Similarly, the last list of a polyline entity is a footer subentity likewise not describing any actual drawing component. Subentities inbetween correspond to the sequential drawing components which are joined end-to-end to define the polyline.

In step 310, the variable WTH is the line width of the image of the drawing line. The variable SE is defined as the selected subentity or line in the polyline description. The variable ST is the start point of the polyline and the variable BLG is defined as the ¼ of the tangent of the included angle.

The next line redefines the variable SE as the next subentity in order to define the software variable BL1 as the bulge (¼ the tangent of the included angle) of the next subentity SE. Finally, step 310 defines variable LA (location of point A) as the start point of the polyline. The program then moves to step 312 which asks whether software variables BLG and BL1 are both not equal to zero and whether the polyline is closed. If the answer to all of these questions is yes, the program moves to step 314 which outputs the instruction to the output device "move to LA (location A)".

If the answer in step 312 is no, or after step 314, the program moves to step 316 to define the software variable LB (location B) equal to LA and then redefines LA as the origin point of the next subentity.

After step 316, the program moves to step 318 which asks whether the variable LOOP is less than 1 which was defined equal to 1 in step 302. This forces the program through at least one loop before exiting. Thus, the answer in step 318 is yes and the program moves on to step 320 which asks whether BLG, that is the bulge of the current entity, equals zero. If the bulge is zero, then the selected subentity is not an arc and the program moves to step 322 which redefines BLG as the bulge of the next subentity in sequence. The program then moves to step 324 which asks whether BLG=0. In other words, this asks whether the next subentity is not an arc. If not, the program moves to step 326 to output the instruction "draw line to location A". Note that LA was redefined as the origin of the next subentity in step 316. Thus, step 326 completes the instruction to define a line from the start point of the first subentity to the start point of the next subentity which occurs if the first subentity is a line.

If the answer in step 324 is no, or after step 326, the program moves on to step 328 which asks whether LA equals the start point. In other words, this asks whether the location A, defined as the start point of the next subentity, is back to the start point of the polyline entity which means that the drawing figure is complete. If no, the program moves to step 330 which defines SE as the next subentity and redefines LB as LA. Note that the program initially defines LA as the start point of the polyline, sets LB equal to LA, and then redefines LA as the start point of the next subentity and so forth in sequence through all of the subentities of the polyline.

The program then moves to step 332 which asks whether LA is undefined. This occurs only when the "next subentity" is the last line of the polyline entity which is a footer containing no information concerning subentity start point locations. If the answer in step 332 is no, the program loops back to the step 318.

Inasmuch as the variable LOOP is still less than 1, the program moves again to step 320. Recall that BLG was redefined in step 324 as the bulge of the next subentity. If the next subentity is an arc, then BLG does not equal zero and the program moves from step 320 to step 334 which calculates the variables according to the formulas as shown. Step 334 converts the plotting data of an arc defined in vector notation in AutoCAD into corresponding plotting data suitable for use by the output device in device notation. In this case, device notation is POSTSCRIPT for a laser printer, LINOTYPE, and so forth.

Any curved line can be defined as one or more arcs with each arc being a part of a circle circumference. Thus, an arc can be defined as a center, a radius and start and stop angles. Step 334 defines the variable CORD as the distance from LA to LB which is the cord of the arc. The variable theta is defined as four times the arc-tangent of the variable BLG. Recall that BLG is ¼ the tangent of the included angle of the arc and thus theta is derived from this. Variable B is defined as the angle from LA to LB and the variable A is defined as ½ the quantity of 180-degrees minus theta. With these variables defined, the radius (RAD) of the circle of which the arc is a part can then be defined as ½ of the CORD divided by the sum of ½ theta. The center (CENT) of the circle can now be defined as the point from LB at the distance RAD and an angle of A+B.

The variables CX and CY are defined as the respective X and Y coordinates of CENT, A1 and A2 are respectively defined as the angles from CENT to LB and LA (start and stop point of the arc) in degrees. Lastly, the variable R is defined as the length of the radius.

The program then moves on to step 336 which outputs the variables CX, CY, A1, A2, and RAD which are the corresponding plotting data supplied to the output device from which the device can create the arc as a smooth curve rather than as a series of straight line segments as has been the case in the prior art.

The program then moves to step 338 which asks whether the bulge of the curve is less than zero in order to determine in which direction the arc bulges. If the answer in step 338 is no, the program moves to step 340 to output the instruction that the arc is a counterclockwise arc. If the answer in step 338 is yes, the program moves to step 342 to output the instruction that the arc is a clockwise arc. After steps 340 or 342, the program moves on to step 344 which redefines BLG as the bulge of the next subentity.

The route through the flowchart as explained above illustrates a situation in which the first subentity is a straight line and the next subentity is an arc in order to illustrate the concepts of the present invention in converting a complicated drawing entity in vector notation into instructions in POSTSCRIPT notation for the output device.

The process as described above for lines and arcs making up the polyline entity continues until the last subentity. When this occurs in step 332, variable LA is not defined because the last line of the polyline entity is the footer which contains no definition of LA. Thus, the answer in step 332 is yes, and the program moves to step 334 which asks whether the polyline is closed. If yes, LA is defined as the start point of the subentity and the program loops back to 318 and through the appropriate branch from step 320 for the last drawing component subentity drawing. In step 328, LA equals ST, and the program moves to step 338 which increments the variable LOOP by 1 and the program loops back to step 318.

If, in step 334, the answer is no, the program moves to step 340 to again increment variable LOOP by 1 and loops back to step 318.

Since LOOP now equals 1, the answer in step 318 is no and the program moves to step 342 which again asks whether the polyline is closed. If yes, the program moves to step 344 which outputs the instruction that the polyline is closed.

If the answer in step 342 is no, or after step 344, the program moves to step 346 which asks whether the line width (WTH) equals zero. If no, the program moves to step 348 to output the instruction to stroke the path of the polyline according to the line width WTH. If, in step 346, WTH equals zero, the program moves to step 350 which outputs the instruction to fill the closed polyline solid. Thus, one of the variables which can be selected by the drafter of the device is the line width which, if defined as zero, indicates that the figure formed by the polyline should be filled as a solid. After steps 348 or 350, the program returns to main program 200 at step 210a.

Flowcharts for subroutines for arcs, lines and other AutoCAS entities are not shown inasmuch as they are much simpler to encode than the subroutine for PLINE as described above. For example, a subroutine for an arc is easily developed by one skilled in the art by developing the data for arc center radius and start and stop angles as described with PLINE. Similarly, a line entity can easily be connected by specifying the start and end points. A subroutine for a circle entity can easily be encoded by identifying the center of the circle and the radius.

Figure 4B:
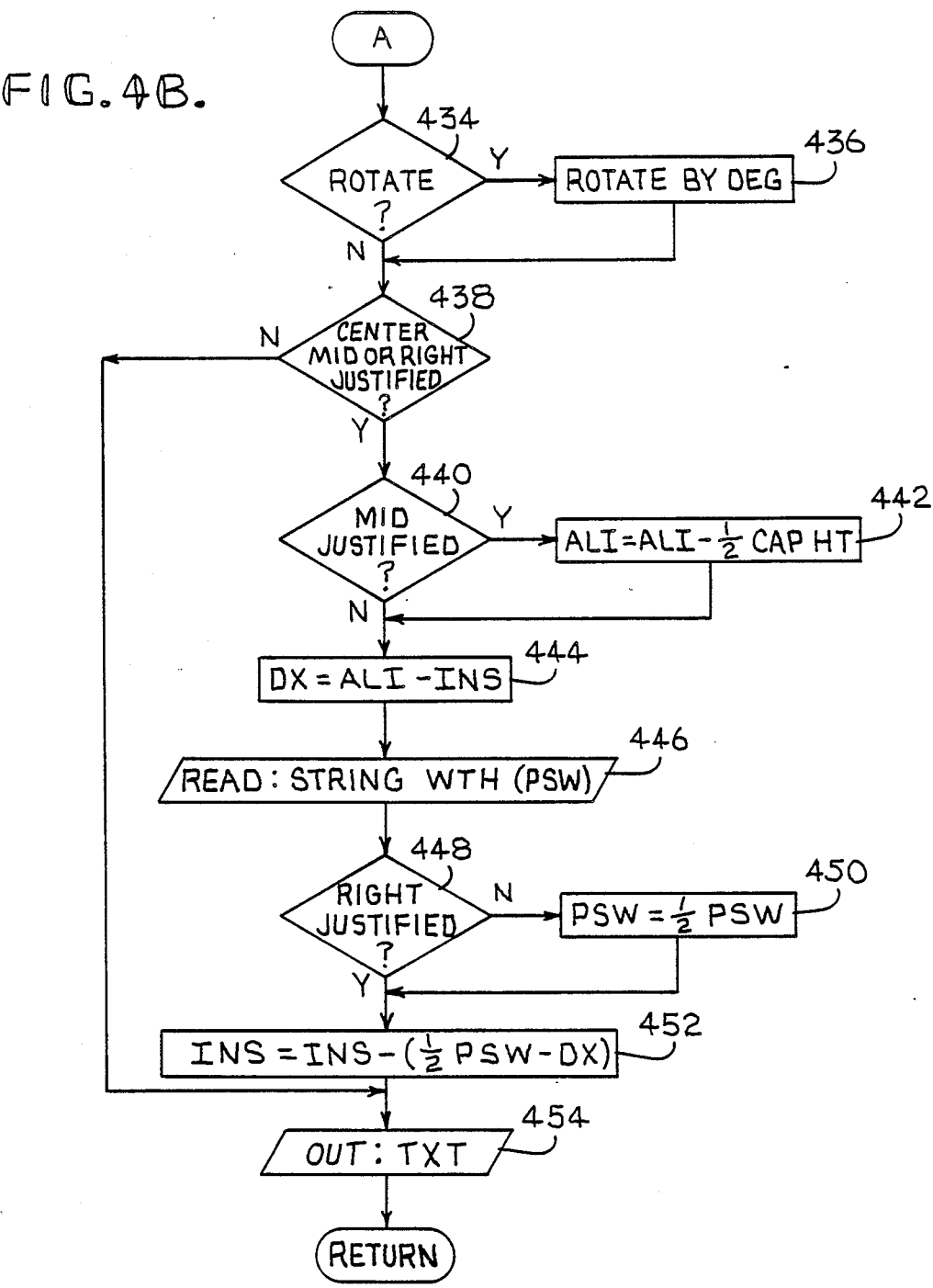

FIGS. 4a and 4b are flowcharts illustrating the conversion of a text entity generated by CAD system 10. Generally speaking, TEXT subroutine 400 allows the drafter to input a desired font style for the text characters of the output image. The program then retrieves data from the memory of the output device corresponding to the desired font style and spaces the text characters on CRT display 18 so that the drafter can see the relative relationship of the text characters to the drawing even though the screen display does not show the actual font style since the screen display is generated by the AutoCAD program.

Additionally, subroutine TEXT 400 outputs appropriate instructions to the output device such as laser printer 24 to create the text characters according to the selected font style and according to the height and width dimensions also specified by the drafter. Finally, subroutine 200 justifies the text as desired as left, right, center, or middle, which may be necessary because the selected font style may cause the string of text characters to be wider or narrower than the corresponding width as originally generated by the AutoCAD program Subroutine TEXT 400 begins at step 402 which converts certain AutoCAD symbols into POSTSCRIPT notation which may be necessary in the case of the symbol "0", for example. The program then moves to step 404 which defines the variable TXT equal to the string of text characters. The program then moves to step 406 which prompts the drafter to enter the desired font style. Those skilled in the art will appreciate that step 406 can be entered at any time in the drawing process as long as it before the drawing is actually outputted.

The program then moves to step 408 which defines the various software variables as shown. The variables HT and WTH respectively define the text height and the text width factor. That is to say, AutoCAD defines text width as a percentage of text height. The variable STY represents the desired font style and the variable INS is the insertion point which is the lowermost and leftmost point of the leftmost character in the character string. The variable ALI is the alignment coordinate which is initially defined as the coordinate of the "center of mass" of the text string. The variable ROT indicates whether the text should be rotated relative to the drawing, variable JUS indicates the type of justification, and variable DEG indicates the text rotation angle in degrees. Finally, the variable SUM is the sum of HT and WTH.

In order to convert the textual string into the proper POSTSCRIPT notation, it is necessary for the AutoSCRIPT program to have certain information regarding the font style, respective dimensions, and other data. Accordingly, the next few steps in the program retrieve this information from laser printer 24 and use that information in developing the corresponding plotting data for the text entity to be outputted.

Accordingly, the program moves on to step 410 which asks whether STY is not equal STY1, or SUM is not equal to SUM1. In other words, this step asks whether there has been a change in the style or dimensions of the characters since the last text entity was processed. If either the text style or the text dimensions have changed, the answer in step 410 is yes and the program moves on to step 412 which outputs the instructions to laser printer 24 to open the font style file in order to read from it the needed data. The program then moves on to step 412 which asks whether the desired font style is present in the memory of laser printer 24. If no, the program moves on to step 414 which sets the default font style as Helvetica.

If the answer in step 412 is yes, the program moves to step 416 which reads the appropriate font style file in laser printer 24 to obtain the character width factor (WF). That is to say, character font styles residing in the memory of laser printer 24 are defined in terms of factors which are scaled according to the desired size of the characters to be created on the final drawing.

The program then moves to step 418 which scales the text width factor WTH according to the width factor WF retrieved in step 416 according to the formula as shown in step 418.

The program then moves on to step 420 to close the font style file in laser printer 24.

After step 420 or step 414 the program moves to step 422 which asks whether the selected font style equals SDY1 which is the previously selected font style. Note that steps 416 and 418 are necessary if there has been change in textual character dimensions even if no changes occured in font style. Accordingly, in step 422, if the answer is no, the program moves to step 424 to set the variable STY1 equal to the selected font style STY. The program then moves to step 426 to output the instruction to find font style file for STY1 and set this as the current font style. This step also enters the instructions for the conversions of the symbols as discussed in step 402.

If the answer in step 422 is yes or after step 426 the program moves to step 428 to define the software variable SUM1 equal to SUM.

The program then moves to step 430 which outputs the instruction that the capital letter height variable CAPH is the capital letter height of the selected font style. Font styles are defined in terms of points from the highest ascender to any of the characters in the font style to the lowest descender of any of the characters in the font style. Thus, the font styles are not defined in terms of capital letter height. Accordingly, it is necessary to define the capital letter height in "points" of a capital letter in the desired font style. This is made necessary because AutoCAD defines characters in terms of capital letter height rather than in terms of font style points. Step 430 also proportions variables WTH and HT by variable CAPH so that the width and height of the characters are defined in terms of points. The program then moves to step 432 which outputs the instruction to move to the insertion point INS Steps 412–432 complete the conversion process for the desired font style which, once completed, need not be done again until font or character dimensions are changed. Accordingly, if the answer in step 410 is no, the program bypasses steps 412–432.

If the answer in step 410 is no, or after step 432, the program moves to step 434, which asks whether the text string is to be rotated relative to the drawing. If yes, the program moves to step 436 and outputs the instruction to rotate the text string TXT according to the rotation angle DEG. It the answer to step 434 is no, or after step 436, the program moves to step 438.

The next few steps in the program are concerned with justifying the textual character string in the new font style so that it ends up with the same justification as originally created in AutoCAD. That is to say, if the original text string was right justified, for example, the text string in the new font style needs to be manipulated so that it is also right justified since the new text string may be wider or narrower than that originally created. AutoScript inserts the character string at the insertion point and if the character string is to be right justified, center justified, or middle justified, the insertion point needs to be shifted appropriately to achieve the desired justification.

In step 438, the program asks whether the text string is to be center, middle, or right justified. If it is to be left justified, the answer is no, and the subsequent steps are unnecessary because AutoSCRIPT inserts the character at the insertion point which automatically left justifies the text.

If the answer in step 438 is yes, the program moves to step 440 which asks whether the text is middle justified. Middle corresponds to the center of mass of the textual string and thus the middle justification point is above the base line of the text. Accordingly, if the answer in step 440 is yes, the program moves on to step 442 to redefine the alignment point variable ALI as ALI minus ½ the cap height. This shifts ALI down to base line. If the text is center justified, such a shift is unnecessary.

If the answer to step 440 is no, or after step 442, the program moves to step 444 which defines the software variable DX as ALI minus the insertion point in AutoCAD units. The program then moves to step 446 which reads the character string width in POSTSCRIPT units from the laser 24.

The program then moves to step 448 which asks whether the text is right justified. If no, then the text is middle or center justified and the program moves to step 450 which redefines the text width in POSTSCRIPT for use in the subsequent calculation of the insertion point.

If the answer in step 448 is yes, or after step 450, the program moves to step 452. If the text is to be right justified, and the new string width is wider than the original string width, then the insertion point must be shifted to the left, for example. Since DX corresponds to one-half the string width of the AutoCAD string, then the insertion point should be shifted to the left by one-half the new string width minus one-half the old string width (DX). Thus, in step 452, the insertion point INS is shifted according to the formula as shown. If the text is mid or center justified, the insertion needs only to be shifted half as much as if right justified. Thus, step 450, by recalculating the variable PSW, causes the insertion point to be shifted only half as much in step 452.

If the answer is no in step 438, or after step 452, the program moves to step 454 which outputs the instruction for the textual data in POSTSCRIPT notation. The program then returns to the main loop at step 210*a*.

We claim:

1. In a system for converting entity descriptions in vector notation of drawing components making up a plot wherein said entity description includes plotting data and the identity of entity type such as arc, text, or the like into a format for use by an image creation device such as an electrostatic printer, laser printer, or the like for creating an image of the plot, a method of operating the system for converting the entity descriptions in vector notation into entity descriptions in device notations, such as page description language, said method comprising the steps of:

selecting an entity description for conversion;

identifying the type of the entity described in the selected entity description;

converting the plotting data in vector notation of the selected entity description into corresponding plotting data in device notation according to the type of entity described in the selected entity description; and producing signals for output representative of said entity description in device notation including signals representative of said entity type and said corresponding plotting data for use by said image creation device in creating an image of the drawing entity corresponding to said selected entity description according to said corresponding plotting data;

the image creation device further including means for producing an image of said selected entity at a selected gray scale level according to said corresponding plotting data, said method further including the steps of entering signals representative of a selected gray scale level of said selected entity, and including said gray scale level in said corresponding plotting data.

2. The method as set forth in claim 1, further including the step of selecting a predetermined default gray scale level in the absence of a gray scale level entered in said entering step.

3. In a system for converting entity description in vector notation of drawing components making up a plot wherein said entity description includes plotting data and the identity of entity type such as arc, text, or the like into a format for use by an image creation device such as an electrostatic printer, laser printer, or the like for creating an image of the plot, a method of operating the system for converting the entity descriptions in vector notation into entity descriptions in device notation, such as page description language, said method comprising the steps of:

selecting an entity description for conversion;

identifying the type of the entity described in the selected entity description;

converting the plotting data in vector notation of the selected entity description into corresponding plotting data in device notation according to the type of entity described in the selected entity description; and producing signals for output representative of said entity description in device notation including signals representative of said entity type and said corresponding plotting data for use by said image creation device in creating an image of the drawing entity corresponding to said selected entity description according to said corresponding plotting data, the image creation device further including means for producing a reversed image of said selected entity according to said correspondence plotting data, said method further including the steps of optionally entering the signals representative of a selection for a reversed image of said selected entity; and including said reverse time selection in said corresponding plotting data.

4. In an apparatus for converting entity descriptions in vector notation of drawing components making up a plot wherein said entity description include plotting data and the identity of identity type such as arc, text, or the like into a format for use by an image creation device such as an electrostatic printer, laser printer, or the like for creating an image of the plot, a system for converting entity descriptions in vector notation into entity description in device notation, said system comprising:

means for selecting an entity description for conversion;

means for identifying the type of the entity described in the selected entity description;

means for converting the plotting data in vector notation of the selected entity description into corresponding plotting data in device notation according to the type of entity described in the selected entity description; and means for producing signals for output representative of said entity description in device notation including for use by said image creation device in creating an image of the selected drawing entity description according to said corresponding plotting data wherein the entity type of said selected entity includes text and including at least one text character, said plotting data of said selected entity including height and width information of said character, said image creation device having memory means in operable association therewith for storing information for use by the device for creating images of said text characters in a selected font style and height and width according to said corresponding plotting data, said converting means including means for entering signals representative of the desired font style of the image of said text characters and means for using said height and width information of said selected entity to produce height and width information corresponding to said selected font style.

5. The system as set forth in claim 4, said entering means further including means for retrieving from memory means dimension factor data corresponding to said selected font style, said using means further including means for transforming said height and width information of said selected entity according to said dimension factor data in order to produce said height and width information corresponding to said selected font style.

6. In an apparatus for converting entity descriptions in vector notation of drawing components making up a plot wherein said entity description include plotting data and the identity of identity type such as arc, text, or the like into a format for use by an image creation device such as an electrostatic printer, laser printer, or the like for creating an image of the plot, a system for converting entity descriptions in vector notation into entity description in device notation, said system comprising:

means for selecting an entity description for conversion;

means for identifying the type of the entity described in the selected entity description;

means for converting the plotting data in vector notation of the selected entity description into corresponding plotting data in device notation according to the type of entity described in the selected entity description; and means for producing signals for output representative of said entity description in device notation including for use by said image creation device in creating an image of the selected drawing entity description according to said corresponding plotting data, the image creation device including means for producing an image of said selected entity at a selected gray scale level according to said corresponding plotting data, said conversion system further including means for entering signals representative of a selected gray scale level of said selected entity and means for including said gray scale level in said corresponding plotting data.

7. The system as set forth in claim 6, further including means for selecting a predetermined default gray scale level in the absence of an entered gray scale level.

8. In an apparatus for converting entity descriptions in vector notation of drawing components making up a plot wherein said entity description include plotting data and the identity of identity type such as arc, text, or the like into a format for use by an image creation device such as an electrostatic printer, laser printer, or the like for creating an image of the plot, a system for converting entity descriptions in vector notation into entity description in device notation, said system comprising:

means for selecting an entity description for conversion;

means for identifying the type of the entity described in the selected entity description;

means for converting the plotting data in vector notation of the selected entity description into corresponding plotting data in device notation according to the type of entity described in the selected entity description; and means for producing signals for output representative of said entity description in device notation including for use by said image creation device in creating an image of the selected drawing entity description according to said corresponding plotting data, the image creation device including means for producing a reversed image of said selected entity according to said corresponding data, said conversion system further including means for entering signals representative of a selection for a reversed image of said selected entity and means for including said reversed image selection to all corresponding plotting data.

9. A method of operating a computer-aided design system for producing output signals usable by a raster-based imaging device such as an electrostatic printer, laser printer, or the like, the design system having storage means for storing data representative of drawing component curves, among others, such as freehand curves, arcs, circles, or the like, and including means for producing plotter signals representative of the drawing components as respective plurality of straight vectors approximating the curves, said method comprising the steps of:

retrieving data representative of a selected drawing component from the storage means;

converting the retrieved data into an entity description including dimensional parameters of the selected drawing component into a format compatible with a selected raster-based image device; and producing output signals representative of said entity description and supplying said output signals to said selected device for printing an image of said selected drawing component as a smooth curve without approximating said curve with a plurality of straight vectors, wherein said selected drawing component includes text having at least one text characters, said entity description including height and width information of said character, the image creation device having memory means in operable association therewith for storing information for use by the device for creating images of text characters in a selected font style and size according to the entity description, said converting step including the steps of:

entering signals representative of the desired font style of the image of said text character, and using said height and width information of said entity description corresponding to said text character to produce height and width information corresponding to said selected font style.

10. The method as set forth in claim 9, wherein said selected drawing component includes an arc, said entity description identifying said arc, the radius of said arc, the center coordinates of said arc, and respective angles from the center of said arc to the start and end locations of said arc.

11. The method as set forth in claim 9, after said entering step, transforming said height and width information of said entity description to produce said height and width information corresponding to said selected font style.

* * * * *